Figure 1:
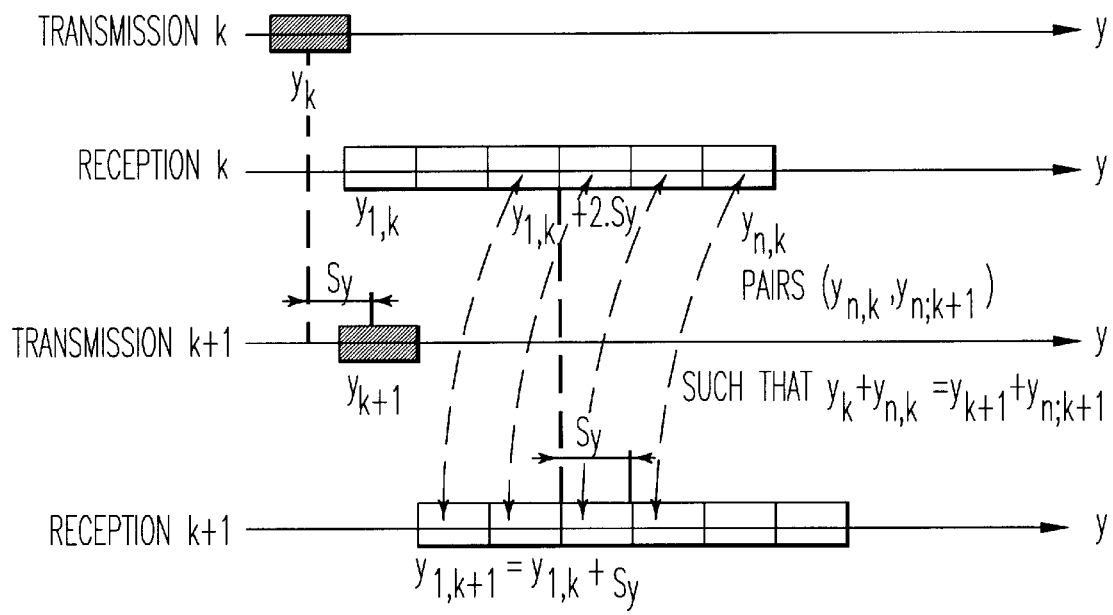

United States Patent
Billon

Patent Number: 5,886,950
Date of Patent: Mar. 23, 1999

[54] AUTO FOCUSING PROCESS FOR SYNTHETIC ANTENNA SONARS

[75] Inventor: Didier Billon, Brest, France

[73] Assignee: Thomson-CSF, Paris, France

[21] Appl. No.: 29,864
[22] PCT Filed: Aug. 20, 1996
[86] PCT No.: PCT/FR96/01298
§ 371 Date: Mar. 17, 1998
§ 102(e) Date: Mar. 17, 1998
[87] PCT Pub. No.: WO97/11452
PCT Pub. Date: Mar. 27, 1997

[30] Foreign Application Priority Data

Sep. 19, 1995 [FR] France .................. 95 10953

[51] Int. Cl.$^6$ .................. G01S 15/89
[52] U.S. Cl. .................. 367/88
[58] Field of Search .................. 367/88

Primary Examiner—Daniel T. Pihulic
Attorney, Agent, or Firm—Oblon, Spivak, McClelland, Maier & Neustadt, P.C.

[57] ABSTRACT

The invention relates to autofocusing processes for synthetic antenna sonars.

It consists in using at least two frequencies having different phase centers and the positions of which vary along the physical receiving antenna from one recurrence to the next. In one embodiment, three distinct frequencies are used, one for the image and the other two for the autofocusing. In another embodiment, two distinct frequencies are used, which serve alternately for the autofocusing and for the image. In another embodiment at least three distinct frequencies are used, all of which serve in the autofocusing and the formation of the image by aperture synthesis and the transmission phase centers of which, distributed at a constant spacing along the physical receiving antenna, are displaced from one recurrence to the next according to a cyclic permutation.

7 Claims, 4 Drawing Sheets

AUTO FOCUSING PROCESS FOR SYNTHETIC ANTENNA SONARS

The present invention relates to synthetic antenna sonars in which the physical antenna is formed by a linear array of transducers. All the transducers are active in receive mode whereas only some of them are used for transmission.

To form the channels of such a synthetic antenna, the K×N signals delivered by the N transducers during K successive recurrences are combined linearly. To do this, it is necessary to know the geometry of the synthetic antenna, that is to say the position of the phase centres of the transmitting and receiving transducers, for the duration of the K recurrences in a plane Oxy where Ox is the beam axis towards the bottom (whose inclination in the elevation plane varies within the recurrence like the elevation of the bottom) and Oy is the axis perpendicular to Ox which is closest to the mean path of the platform. The deviations of the synthetic antenna with respect to the plane Oxy are small enough to be neglected in most practical cases.

Means are also available which are accurate enough for measuring the displacement of the support of the transducers along Oy, in respect of which direction less accuracy is needed than in respect of Ox. Thus, the problem of knowing the geometry of the synthetic antenna in the plane Oxy is reduced to that of knowing its geometry along the beam axis Ox.

To solve this problem the Westinghouse company has proposed applying the principle of equivalent phase centres in "Synthetic aperture beamforming with automatic phase compensation for high frequency sonars", R. W. Sheriff, AUV 92 [1]. To do this, the deviation is determined between the sum of the abscissae $x_k$ of the transmission phase centre at recurrence k and $x_{n,k}$ of the phase centre of receiving sensor n at recurrence k, and the sum of the abscissae $x_{k+1}$ of the transmission phase centre at recurrence k+1 and of receiving sensor n' at recurrence k+1 by measuring the intercorrelation delay of the two signals from sensors (n,k) and (n',k+1) chosen such that:

$$Y_k + Y_{n,k} = Y_{k+1} + Y_{n',k+1} \qquad (1)$$

which is the condition of phase centre equivalence corresponding to a maximum correlation for the signals received on sensor n at recurrence k and sensor n' at recurrence k+1.

In the document [1] an array of two transducers is considered, the first of which is used in transmit and receive mode, and the second in receive mode only. The displacement in the Oy direction between two successive recurrences being equal to half the distance between the two sensors, relation (1) is satisfied by n=2 and n'=1. As represented in FIG. 1, this can be generalized to an array of N sensors and to a displacement $\delta y$ of less than half the length of the array for every $Y_{n,k}$ such that $$Y_{n,k} - 2 \cdot \delta y \geq Y_{1,k} \qquad (2)$$

Spatial interpolation over the signals of recurrence k+1 can be used to determine a sensor signal corresponding to a position $y_{n',k+1}$ of its phase centre over Oy such that we have (1) (since $y_{k+1} = y_k + \delta y$ and $y_{n',k+1} = y_{n',k} + \delta y$, (1) is equivalent to $y_{n,k} = y_{n',k} + 2.\delta y$), and to then estimate the intercorrelation delay between the interpolated sensor, (n',k+1) and the sensor (n,k), which will be denoted $\tau_{n',n,k}$. The spatial interpolation leads us to consider fractional indices n'. We have $\tau_{n',n,k} = \tau_{n',n,k,x} + \tau_{n',n,k,y}$ where $\tau_{n',n,k,x}$ depends on the abscissae $x_k$, $x_{k+1}$, $x_{n,k}$, $x_{n',k+1}$ which it is desired to estimate and $\tau_{n',n,k,y}$ depends on the ordinates $y_k$, $y_{k+1}$, $y_{n,k}$ and $y_{n',k+1}$.

The ordinates being known, $\tau_{n',n,k,y}$ is known. The measurement of $\tau_{n',n,k,x} = \tau_{n',n,k} - \tau_{n',n,k,y}$ is deduced from the measurement of $\tau_{n',n,k}$.

We then obtain a set of pairs of transmission/reception phase centres ((n,k), (n',k+1)), an estimate of the deviation of the abscissae of which is given by:

$$(X_{k+1} + X_{n',k+1}) - (X_k + X_{n,k}) = -C.\tau_{n',n,k,x} \qquad (3)$$

The ordinates of the transmission phase centres $y_k$ and $y_{k+1}$, and reception phase centres $y_{n,k}$ and $y_{n',k+1}$ are given by measuring the displacement in the direction Oy obtained by the measurement means mentioned above.

It is therefore possible to estimate the shape of the synthetic antenna gradually (from recurrence to recurrence), this leading to the consideration that $x_k + x_{n,k}$ is known, (3) then giving $x_{k+1} + x_{n',k+1}$. The array being linear, we need only know $x_{k+1} + x_{n',k+1}$ for at least two values of n' in order to calculate by linear regression the abscissae $x_{k+1} + x_{n,k+1}$ of the N actual transmission/reception phase centres (that is to say those which are not spatially interpolated, n an integer) for recurrence k+1. A measure of the rotation of the antenna may possibly also be taken into account in the estimation of the $x_{k+1} + x_{n,k}$ values.

The simplest way of carrying out the autofocusing processing consists in compensating for the deviations of the synthetic antenna with respect to Oy by applying delays defined by the following formula to the signals from the sensors, c being the speed of sound in water:

$$t_{n,k} = \frac{x_k + x_{n,k}}{C} \qquad (4)$$

Channel formation is then carried out as for an antenna with the same $y_k$ and $y_{n,k}$ values, but whose $x_k$ and $x_{n,k}$ values are all zero.

When the deviations in the direction Ox along the antenna are too large, this simple correction can no longer be used, the focusing delays then depending in a non-separable manner on the estimated deformed shape and on the point of focusing.

This method is all the more accurate the larger the number of sensors which can be paired up between two successive recurrences k and k+1 according to relation (1). The constraint (2) produces a limitation on this. For a sufficient number of sensors, this relation (2) implies that the number of sensors for recurrence k which can be used to estimate the transverse displacement of the antenna between recurrences k and k+1 is given by:

$$I = N \times \frac{L - 2 \cdot \delta y}{L} \qquad (5)$$

Hence, it may be seen that in order for there to be a significant proportion of usable sensors, the interrecurrence displacement must be markedly less than L/2. Moreover, L/2 is the maximum value of the interrecurrence displacement beyond which spatial under-sampling of the synthetic antenna occurs, impairing its performance as is explained in the article "Detection and Imaging Performance of a Synthetic Aperture Sonar", D. Billon, F. Le Clerc, L. Hué, OCEANS 93, [2]. In practice, this limitation is constraining: if L=3 m and the range $R_{max}$ of the sonar is equal to 500 m, the maximum speed is $V=(L/2)/(2R_{max}/c)=4.5$ knots. A further lowering of the speed limit would therefore be difficult to accept.

In order to implement the autofocusing method described earlier without lowering the speed limit, it is proposed to displace the phase centre for transmission k+1 electronically in the direction opposite to the physical displacement of the antenna, with respect to the phase centre for transmission k. The constraint (2) then becomes:

$$y_{n,k} \geq y_{1,k} + 2\delta y - e \quad (6)$$

where e is the rearwards electronic displacement of the transmission phase centre for recurrence k+1 with respect to recurrence k, that is to say $y_{k+1}=y_k+\delta y-e$. For $e=2.\delta y$ all of the sensors of the antenna can be used for the autofocusing since the constraint (6) which can then be written $y_{n,k} \geq y_{1,k}$ is satisfied for every n.

In the general case the number of sensors which can be used for the autofocusing is:

$$I = N \times \frac{L - |2 \cdot \delta y - e|}{L} \quad (7)$$

This process of electronically displacing transmission in the direction opposite to the advancing of the platform so as to afford a strong correlation in the signals of two successive recurrences is known in the field of radar, for applications other than synthetic antenna autofocusing, where the corresponding type of antenna is called DPCA (Displaced Phase Centre Antenna).

The invention involves applying such a process for autofocusing the synthetic antennas of a sonar.

According to a first embodiment, two different frequencies $f_1$ and $f_2$ are used to perform the autofocusing, and a third different frequency $f_0$ to form the image.

According to another characteristic of this first embodiment, the frequencies $f_1$ and $f_2$ are transmitted alternately at the ends of the antenna, and the frequency $f_0$ at a fixed point thereof, for example the centre.

According to a second embodiment, two different frequencies $f_1$ and $f_2$ are used, the transmission phase centres of these frequencies are displaced. in opposite directions over K successive recurrences and then the directions of displacement are reversed, the frequency whose phase centre is displaced towards the front of the antenna is used to form a synthetic antenna over these K recurrences, and the other frequency is used to perform the autofocusing.

According to another characteristic of this second embodiment, the values K=2 and K=3 correspond to two preferred cases of the second embodiment.

According to a third embodiment, M distinct frequencies $f_1, \ldots f_M$ are used, the transmission phase centres of which are distributed along the physical receiving antenna with a constant spacing and are displaced according to a cyclic permutation at each new recurrence. This cyclic permutation displaces, by one spacing forwards, the phase centres of M−1 frequencies out of the M frequencies, and by M−1 spacings rearwards the phase centre of the remaining frequency, this being the only one used to apply the principle of equivalent phase centres between the new recurrence and the preceding recurrence so as to estimate the motion along Ox according to the general process of the invention. The M frequencies are used to form the image by aperture synthesis.

Figure 2:
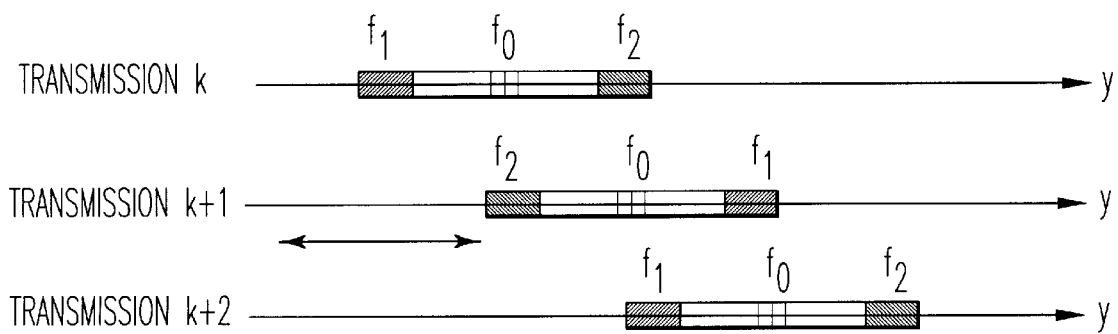
Figure 3:
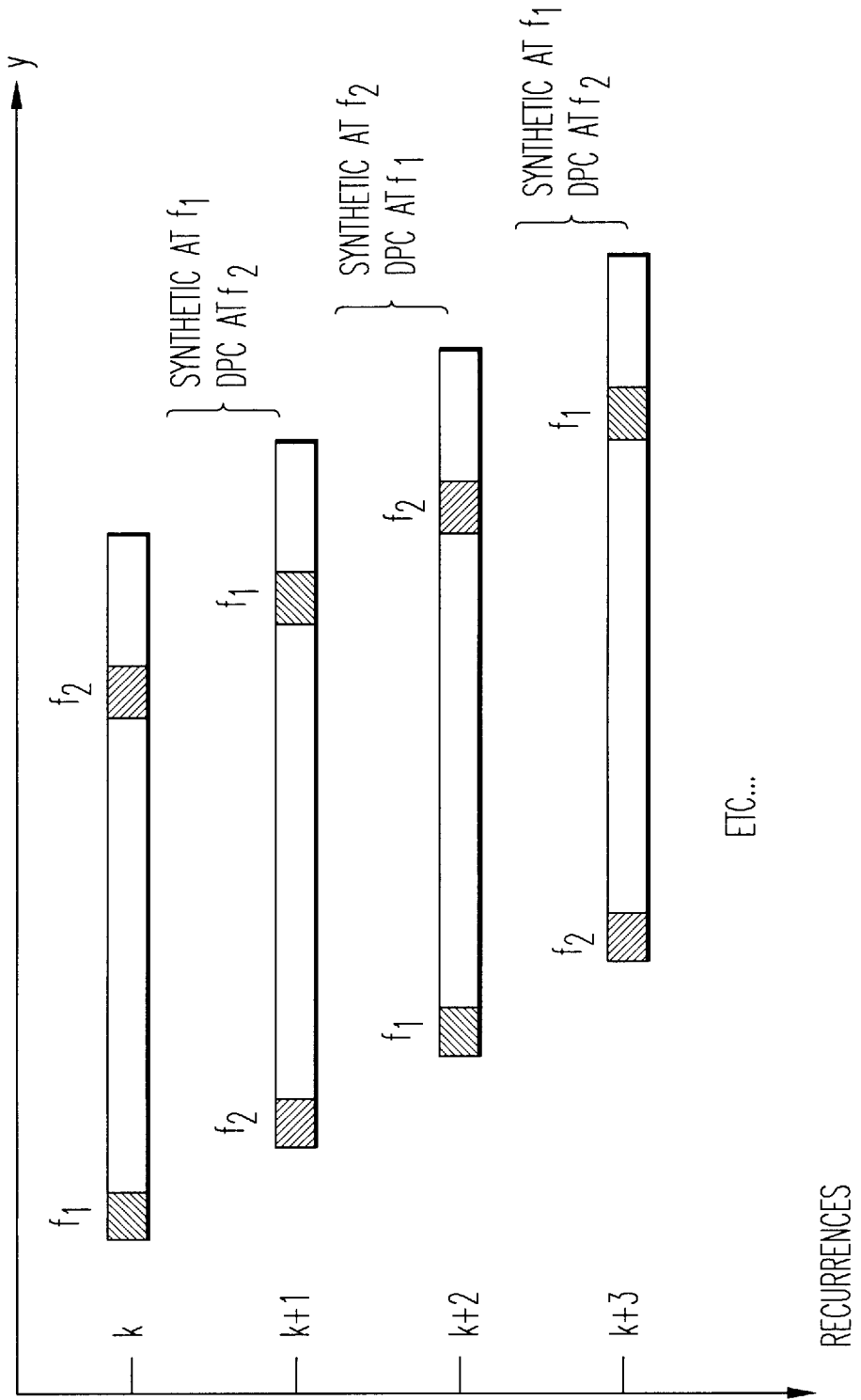
Figure 4:
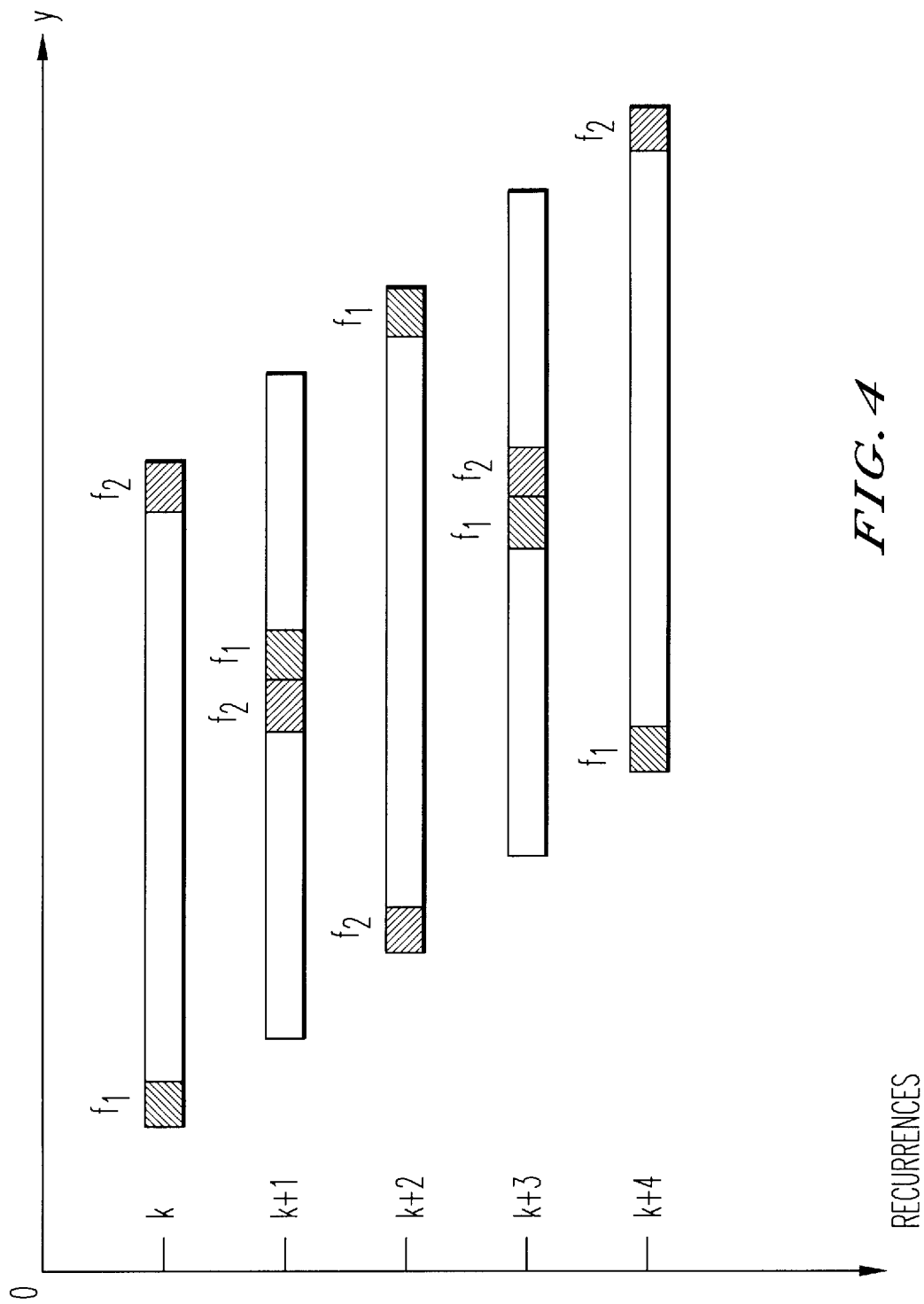
Figure 5:
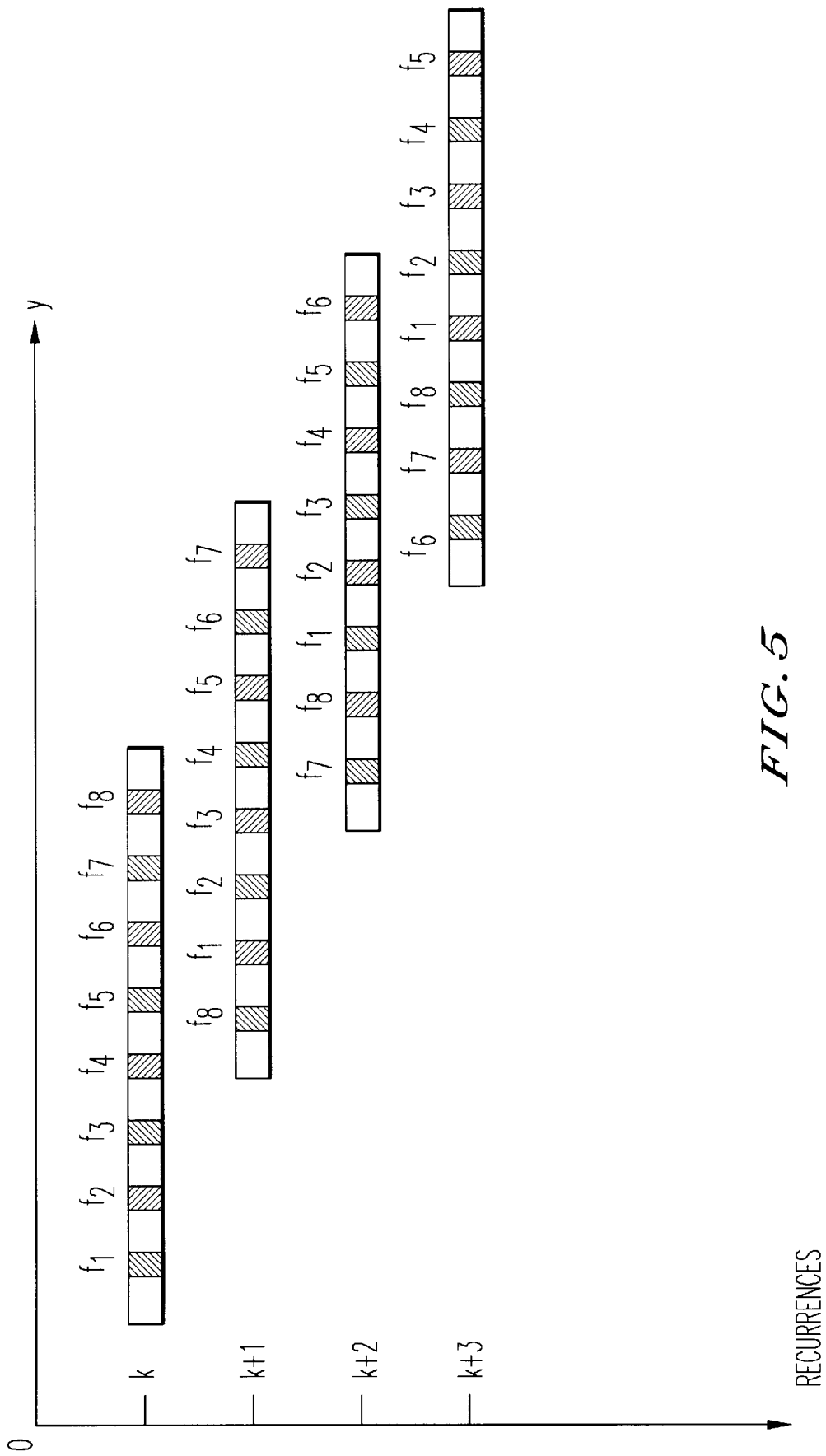

Other features and advantages of the invention will emerge clearly from the following description, given by way of non-limiting example with regard to the appended figures which represent:

FIG. 1, an explanatory diagram of the known process of reference [1] generalized for a linear array of N sensors, FIG. 2, an explanatory diagram of a first embodiment of the invention, FIG. 3, an explanatory diagram of a first example of a second embodiment of the invention, FIG. 4, an explanatory diagram of a second example of this second embodiment; and FIG. 5, an explanatory diagram of a third embodiment of the invention.

In a first embodiment, the process according to the invention is used to produce a side-looking sonar operating at a relatively "thigh" speed.

This sonar operates in three frequency bands centred on $f_0$, $f_1$ and $f_2$. The phase centre for the transmission at $f_0$ is fixed, thus enabling the sonar image to be formed in this frequency band.

The frequencies $f_1$ and $f_2$ are used in accordance with the process described above to estimate the geometry of the synthetic antenna. The transmission phase centres $f_1$ and $f_2$ are on an axis parallel to the antenna and $2.\delta y$ distant, it being possible to achieve this by using some of the transducers of the receiving antenna for transmission. The allocation of $f_1$ and $f_2$ to the two phase centres is alternated from recurrence to recurrence. For a given pair of successive recurrences, that one of the two frequencies $f_1$ and $f_2$ which was transmitted at the front at recurrence k and at the rear at recurrence k+1 is used to obtain the autofocusing (determination of the correction delays for the deviations with respect to Oy or of the geometry of the antenna in Oxy as explained earlier) For the next pair, consisting of recurrences k+1 and k+2, the other frequency transmitted at the front at recurrence k+1 and at the point shifted backwards by $2.\delta y$ at recurrence k+2 is used, and so on.

In the more general case, it is possible to choose the location of the phase centre shifted backwards to within a transducer spacing by spatially switching the transmission circuits in a transducer array which may be the same as that for reception, so that e is as close as possible to $2.\delta y$ for $\delta y \leq L/2$. In practice the highest possible speed, and hence $\delta y$ close to L/2, will be sought. This case corresponds to a particular layout in which the transmitters operating at the frequencies $f_1$ and $f_2$ and serving in the autofocusing are located at the two ends of the antenna. The position of the transmitter operating at the frequency $f_0$ and serving for the imaging is unimportant provided that it is fixed. In a particular layout, the centre of the antenna and the two extreme transmitters operate alternately at $f_1$ and $f_2$. This configuration in which transmission occurs on two frequencies alternating at the two ends of the antenna is described in U.S. Pat. No. 5,295,118 filed on 18 Feb. 1993 and published on 15 Mar. 1994. However in this patent, the aim of this transmission device is to double the speed of the platform and the signals received are not employed for autofocusing as is proposed in the present invention; this would not be possible since in this case we have $L=e=\delta y$ and relation (7) shows that the number of sensors which can be used to autofocus the antenna is zero. Furthermore, the transmission devices are different since in a first embodiment the invention uses three frequencies, one sonar imaging frequency and two auxiliary autofocusing frequencies, as represented in FIG. 2 and, in a second embodiment, the invention uses two frequencies whose transmission phase centres are not necessarily at the two ends of the antenna and may be located at more than 2 points during the recurrences.

In a concrete example of this first embodiment, the following parameters have been used:
 range, recurrence: $R_{max}$=500 m, Tr=670 ms
 antenna length, speed: L=4 m, $V_{max}$=6 knots
 frequencies: $f_0$=100 kHz, $f_1$=90 kHz, $f_2$=80 kHz
 bandwidth: $B_0$=20 kHz, $B_1$=10 kHz, $B_2$=10 kHz
 pulse duration: $T_0=T_1=T_2$=5 ms (in "chirp" form) form
 number of sensors: N=80, K=30 at the maximum range of 500 m length of the transmission pupils: $l_0=0.1$ m, $l_1=l_2=0.4$ m
aperture of the transmission diagrams: $2\theta-3,0=8°$, $2\theta-3,1 \approx 2\theta-3,2 \approx 2°$ (the index n in $\theta-3,n$ indicates the corresponding frequency fn)

resolution along Ox: $c/2B_0=4$ cm, along Oy: $l_0/2=5$ cm.

Autofocusing beams which are finer than those used for the imaging are employed because the autofocusing method works all the better the finer the beams, whilst the resolution of the synthetic antenna is inversely proportional to the width of the transmission beam. The three transmission beams are azimuthally stabilized in a direction Ox perpendicular to the mean position of the antenna by means of an attitude unit, the output from which is merged with the estimate of the rotation of the antenna in the plane Oxy, as provided by the autofocusing. Electronic pointing is carried out by using the two central transducers at $f_0$ and the 8 transducers at each end at $f_1$ and $f_2$. Spatial oversampling of the actual antenna facilitates the spatial interpolation required by the autofocusing method.

In a second embodiment, the process according to the invention is used to produce a hull sonar intended to operate at "slow" speed in order to carry out mine hunting.

In a known manner, in order to classify an object detected by means of its detecting sonar, the mine hunting vessel approaches the suspect object detected at a safety distance of the order of 150 meters and uses its shadow classifying sonar to obtain an image classifying the object. To do this it rotates about the object while maintaining its safety distance and it analyses the deformation of the acoustic shadow cast on the bottom in this motion so as to obtain the shape of the object. The quality of the image from the shadow is limited chiefly by the azimuthal resolution of the sonar, which is of the order of 0.1° to 0.2°, this being of the same order of magnitude as the size of the objects to be classified. The invention therefore proposes to implement synthetic antenna processing in order to improve this resolution during the circular motion of the boat about the object, this being of great interest operationally. This motion can be performed at low speed, of the order of 2 knots along an axis parallel to the antenna. For a duration of recurrence of 250 ms, corresponding to a maximum range of 180 m, the displacement is 25 cm, this leaving a span of 1 m in a 1.5 m antenna (=1.5 m−2×0.25 m) to carry out autofocusing with a transmission whose phase centre on the antenna is fixed. The same frequency can then be used to form the image and to carry out autofocusing.

The angular resolution of the synthetic antenna in a bottom region insonified during the K successive recurrences is $$2\theta_{3,s} \cong \frac{\lambda}{L + 2(K-1) \cdot \delta y} \quad (8)$$

to be compared with the resolution of the actual antenna:

$$2\theta_{3,r} \cong \frac{\lambda}{L} \quad (9)$$

In the above example (L=1.5 m, $\delta y$=0.25 m), K=4 is therefore required in order to divide the angular resolution by two and K=7 in order to divide it by three. Although these numbers are low as compared with the example of the first embodiment (K=30), they are difficult to use here since, whereas the first embodiment applies chiefly to side-looking sonars mounted on towed vehicles navigating near the bottom, the second embodiment described below relates essentially to hull sonars whose antenna is only a few meters below the surface where the spatio-temporal coherence of the medium is markedly smaller than near the bottom. Consequently, for a given objective as regards the resolution of the synthetic antenna, it is important to minimize the physical displacement of the actual antenna and the formation time for the synthetic antenna, this amounting to minimizing K. Another advantage of minimizing K is that it simplifies the synthetic antenna autofocusing and formation processing operations. This is the subject of this second embodiment of the invention.

In this embodiment there are only two frequencies $f_1$ and $f_2$. During the K successive recurrences which serve to form the synthetic antenna, the transmission phase centre, for example $f_1$, is displaced along the antenna in the direction of the motion of the antenna at each new recurrence, whilst the transmission phase centre of the other frequency, for example $f_2$, is displaced in the opposite direction. The frequency $f_1$ is used to form the synthetic antenna and the frequency $f_2$ to autofocus it according to the principle set out earlier. During the K−1 succeeding recurrences the direction of the displacements of the transmission phase centres of $f_1$ and $f_2$ is reversed and a synthetic antenna is formed at the frequency $f_2$ with the last of the K previous recurrences and these K−1 new recurrences. And so on and so forth. If $T_r$ is the duration of the recurrence of the sonar, the period of the images formed in this way is $(K-1).T_r$.

If E is the total excursion during the K recurrences of the phase centre for the transmission at the frequency serving to form the synthetic antenna, the angular resolution obtained is $$2\theta_{3,s} \cong \frac{\lambda}{L + E + 2(K-1) \cdot \delta y} \quad (10)$$

Let $e_+$ and $e_-$ be the displacements between two recurrences respectively of the phase centre for the transmission at the synthetic antenna formation frequency and of the phase centre for the transmission at the synthetic antenna autofocusing frequency. The following constraint must hold:

$$e_+ + 2\delta y \leq L \quad (11)$$

This expression represents the condition of correct spatial sampling of the synthetic antenna. The number I of sensors to which the principle of phase centre equivalence can be applied, at the frequency whose transmission phase centre shifts backwards, is given by expression (7) where $e=e_-$.

In a first concrete example of this second embodiment, represented in FIG. 3, the parameters are the following:

L=1.5 m, N=100, $f_1$=410 kHz, $f_2$=430 kHz $B_1=B_2$=15 kHz, $T_1=T_2$=7 ms

Length of the 2 transmission pupils=10.5 cm

Field width at 150 m and −3 dB of attenuation in the sound level=4.5 m

K=2, E=$e_+$=$e_-$≦1.4 m

Image recurrence=sonar recurrence=250 ms

Resolution at 150 m and at the speed of 2 knots=0.05 m×0.18 m.

The two transducers are made up of 7 elements which are elements of the receiving array. The spacing E of the two phase centres is slaved to the transverse speed V with respect to the beam axis according to the relation:

$$E=2V.T_r \quad (12)$$

where $T_r$=250 ms. This variable spacing is produced by electronically switching the elements of the transducers from among the 100 elements of the receiving array.

The two beams are pointed onto the centre of the object to be classified initially through operator designation and subsequently by slaving as a function of the measurements of the heading and speed of the boat.

In a second concrete example, represented in FIG. 4, the parameters are the same, except for:

K=3, E=1.4 m, $e_+ = e_- = 0.75$ m or 0.65 m

Image recurrence=2×sonar recurrences=500 ms

Resolution at 150 m and at the speed V=2 knots=0.05 m×0.14 m.

As represented in FIG. 4, there are four transmission phase centres at ±5 cm and ±0.7 m from the centre.

The invention also proposes a third embodiment, which is more complex and which applies essentially to high-speed side-looking sonars, as in the first embodiment, compared with which it has the advantage of making all the transmitted frequencies available for the imaging by aperture synthesis. The desired sonar pulse is divided spectrally into M pulses with central frequencies $f_1, f_2, \ldots, f_M$ and with the same bandwidth equal to the bandwidth of the desired pulse divided by M. The transmission phase centres are distributed along the physical receiving antenna with a constant spacing p and their allocation to the M frequencies is modified at each new recurrence according to a cyclic permutation such that all the frequencies have their phase centres advanced by one spacing, except for one whose phase centre is shifted backwards by M−1 spacings with respect to the direction of advance of the carrier. The spacing p must satisfy relation (11) with $e_+ = p$. The number I of sensors to which the principle of phase centre equivalence is applied, at the frequency whose transmission phase centre is shifted backwards with respect to the previous recurrence so as to estimate the motion along Ox according to the process of the invention, is given by expression (7) where $e = (M-1)p$. A particular case of interest is that in which M and p are chosen in such a way that all the sensors can be used to carry out autofocusing.

We then have:

$$(M-1)p = 2\delta y \quad (13)$$

and, in view of (11) in which we put $e_+ = p$, we must have $$M \geq \frac{2 \cdot \delta y}{L - 2 \cdot \delta y} + 1. \quad (14)$$

This third embodiment corresponds to the example represented in FIG. 5 in which the parameters are:

$R_{max}$=500 m, L=4 m $T_r$=700 ms, $V_{max}$=5 knots (→δy=3.5 m)

M=8, p=0.5 m $f_1$=91.25 kHz, $f_m+1 = f_m+2.5$ Hz $B_1+B_2 = \ldots = B_8 = 2.5$ kHz $T_1 = T_2 = \ldots = T_8 = 30$ ms N=80, K=30 at 500 m $l_1 = l_2 \ldots l_8 + 0.1$ m $2\theta-3.1 = 2\theta-3.2 = \ldots 2\theta-3.8 = 8°$ Resolution along Ox: c/2B=4 cm Resolution along Oy: $l_m/2 = 5$ cm.

I claim:

1. Autofocusing process for synthetic antenna sonar, characterized in that at least two frequencies are used having different phase centres and the positions of which vary along the physical receiving antenna from one recurrence to the next.

2. Process according to claim 1, characterized in that two different frequencies $f_1$ and $f_2$ are used to perform the autofocusing, and a third different frequency $f_0$ to form the image by aperture synthesis.

3. Process according to claim 2, characterized in that the frequencies $f_1$ and $f_2$ are transmitted alternately at the ends of the antenna, and the frequency $f_0$ at a fixed point thereof.

4. Process according to claim 1, characterized in that two different frequencies $f_1$ and $f_2$ are used, in that the transmission phase centres of these frequencies are displaced in opposite directions over K successive recurrences and in that the directions of displacement are reversed, in that the frequency whose phase centre is displaced towards the front of the antenna is used to form a synthetic antenna over these K recurrences, and in that the other frequency is used to perform the autofocusing.

5. Process according to claim 4, characterized in that K=2.

6. Process according to claim 4, characterized in that K=3.

7. Process according to claim 1, characterized in that M frequencies are used, M≧3, in that their M transmission phase centres are distributed at a constant spacing along the receiving antenna, in that the one-to-one correspondence between the M phase centres and the M frequencies is modified at each new recurrence according to a cyclic permutation, the phase centres of M−1 frequencies being advanced by one spacing and that of the remaining frequency being shifted backwards by M−1 spacings, and in that each of the M frequencies serves in the autofocusing and in the aperture synthesis.

* * * * *

UNITED STATES PATENT AND TRADEMARK OFFICE
CERTIFICATE OF CORRECTION

PATENT NO. : 5,886,950
DATED : March 23, 1999
INVENTOR(S) : Didier Billon

It is certified that error appears in the above-identified patent and that said Letters Patent is hereby corrected as shown below:

On the title page, item [54], and at the top of Column 1, the Title should read:

--AUTOFOCUSING PROCESS FOR SYNTHETIC ANTENNA SONAR--

Signed and Sealed this

Third Day of August, 1999

Attest:

Q. TODD DICKINSON

Attesting Officer

Acting Commissioner of Patents and Trademarks